United States Patent
Yuan et al.

(10) Patent No.: US 10,318,479 B2
(45) Date of Patent: Jun. 11, 2019

(54) METHOD AND DEVICE FOR AUTOMATICALLY IDENTIFYING JUNK FILE

(71) Applicant: BEIJING KINGSOFT INTERNET SECURITY SOFTWARE CO., LTD., Beijing (CN)

(72) Inventors: Guoqing Yuan, Beijing (CN); Kangzong Zhang, Beijing (CN); Nan Zhang, Beijing (CN); Yong Chen, Beijing (CN); Ming Xu, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 296 days.

(21) Appl. No.: 15/318,215

(22) PCT Filed: Jun. 23, 2015

(86) PCT No.: PCT/CN2015/082109
§ 371 (c)(1),
(2) Date: Dec. 12, 2016

(87) PCT Pub. No.: WO2016/000541
PCT Pub. Date: Jan. 7, 2016

(65) Prior Publication Data
US 2017/0124098 A1    May 4, 2017

(30) Foreign Application Priority Data

Jun. 30, 2014    (CN) .......................... 2014 1 0309621

(51) Int. Cl.
*G06F 17/30*    (2006.01)
*G06F 16/11*    (2019.01)
(Continued)

(52) U.S. Cl.
CPC .......... *G06F 16/122* (2019.01); *G06F 16/164* (2019.01); *G06F 17/5009* (2013.01);
(Continued)

(58) Field of Classification Search
CPC ........... G06F 12/0253; G06F 17/30117; G06F 21/56; G06F 21/6218; G06F 11/0709;
(Continued)

(56) References Cited

U.S. PATENT DOCUMENTS 7,640,305 B1 * 12/2009 Arthur ................. G06Q 10/107
707/999.007
8,229,979 B2 * 7/2012 Manolov ............. G06F 12/0253
707/813

(Continued)

FOREIGN PATENT DOCUMENTS

CN    102654872 A    9/2012
CN    103092664 A    5/2013
(Continued)

OTHER PUBLICATIONS

International Search Report issued in PCT/CN2015/082109 dated Sep. 2, 2015 (2 pages).
(Continued)

*Primary Examiner* — Dangelino N Gortayo
(74) *Attorney, Agent, or Firm* — Osha Liang LLP

(57) ABSTRACT

A computer-implemented method and device for automatically identifying a junk file are provided. The method for automatically identifying a junk file includes: acquiring an application to be identified; analyzing the application so as to acquire attribute information of a file generated by the application; matching the attribute information of the file and a preset junk file identification rule; and identifying the file as a junk file if the attribute information of the file is matched with the preset junk file identification rule.

13 Claims, 2 Drawing Sheets

(51) Int. Cl.
  *G06F 16/16* (2019.01)
  *G06F 17/50* (2006.01)
  *G06F 21/56* (2013.01)
  *G06F 16/182* (2019.01)

(52) U.S. Cl.
  CPC .......... *G06F 16/125* (2019.01); *G06F 16/162* (2019.01); *G06F 16/182* (2019.01); *G06F 21/56* (2013.01)

(58) Field of Classification Search
  CPC ........... G06F 17/30011; G06F 17/3007; G06F 17/30082; G06F 17/30085; G06F 17/3012; G06F 17/30165; G06F 17/30876; G06F 17/5009; G06F 21/55
  USPC ....... 707/694, 821, 608, 654, 662, 674, 692, 707/813
  See application file for complete search history.

(56) References Cited

U.S. PATENT DOCUMENTS

| | | | |
|---|---|---|---|
| 8,380,676 B1* | 2/2013 | Eastham | G06F 17/30085 707/662 |
| 2007/0255773 A1* | 11/2007 | Simeonov | G06F 11/0709 |
| 2013/0185797 A1* | 7/2013 | Zhou | G06F 21/52 726/23 |
| 2014/0222761 A1* | 8/2014 | Zhang | G06F 11/1451 707/654 |
| 2014/0365451 A1* | 12/2014 | Chen | G06F 17/30117 707/692 |
| 2015/0088941 A1* | 3/2015 | Stokely | G06F 16/182 707/827 |
| 2016/0055013 A1* | 2/2016 | Liu | G06F 9/44505 713/100 |

FOREIGN PATENT DOCUMENTS

| | | |
|---|---|---|
| CN | 103365882 A | 10/2013 |
| CN | 103369003 A | 10/2013 |
| CN | 104267986 A | 1/2015 |
| CN | 104268220 A | 1/2015 |

OTHER PUBLICATIONS

Written Opinion of the International Searching Authority issued in PCT/CN2015/082109 dated Sep. 2, 2015 (4 pages).

* cited by examiner

… (1)

METHOD AND DEVICE FOR AUTOMATICALLY IDENTIFYING JUNK FILE

CROSS REFERENCE TO RELATED APPLICATION

This application is a U.S. national phase application based up an International Application No. PCT/CN2015/082109, which is based upon and claims a priority to Chinese Patent Application Serial No. 201410309621.8, filed with the State Intellectual Property Office of P. R. China on Jun. 30, 2014 by BEIJING KINGSOFT INTERNET SECURITY SOFTWARE CO., LTD., and titled with "method and device for automatically identifying junk file", the entire contents of which are incorporated herein by reference.

TECHNICAL FIELD

The present disclosure generally relates to a mobile terminal field, and more particularly, to a method and a device for automatically identifying a junk file.

BACKGROUND

With the continuous development of the science and technology, the terminal devices become increasingly intelligent and more and more users start to use smart terminal devices with Android Systems. Since storage of a smart terminal device is limited, it is required to clear junk files regularly so as to ensure that the device has enough storage space when running and has a good performance.

At present, the junk file is identified artificially. A corresponding application (APP for short) is downloaded and run artificially, and different functions of the application are used artificially. The generated file is recorded and then deleted, and then the application is restarted to verify whether the deleted file has an effect on the usage of application, such as causing the breakdown of the application, or making the application stuck etc. If the deleted file does not have an effect on the usage of application, the deleted file may be recognized as a junk file.

However, in a process of implementing the present disclosure, the inventor found that there are following problems in the related art. It is inefficiency and high-cost to identify the junk file in the artificial way, and further the device performance would be decreased since the junk file cannot be cleared completely.

SUMMARY

The method for automatically identifying a junk file according to embodiments of the present disclosure includes: acquiring an application to be identified; analyzing the application so as to acquire attribute information of a file generated by the application; and matching the attribute information of the file and a preset junk file identification rule, and identifying the file as a junk file if the attribute information of the file is matched with the preset junk file identification rule.

A non-transitory computer storage medium according to embodiments of the present disclosure has one or more modules stored therein, wherein the one or more modules are caused to perform following acts: acquiring an application to be identified; analyzing the application so as to acquire attribute information of a file generated by the application; matching the attribute information of the file with a preset junk file identification rule; and identifying the file as a junk file if the attribute information of the file is matched with the preset junk file identification rule.

The mobile terminal according to embodiments of the present disclosure includes: a shell, a processor, a memory, a circuit board and a power supply circuit, in which the circuit board is located in a space formed by the shell, the processor and the memory are arranged on the circuit board; the power supply circuit is configured to supply power for each circuit or component in the mobile terminal; the memory is configured to store executable program codes; the processor executes a program corresponding to the executable program codes by reading the executable program codes stored in the memory so as to perform following acts: acquiring an application to be identified; analyzing the application so as to acquire attribute information of a file generated by the application; and matching the attribute information of the file with a preset junk file identification rule, and identifying the file as a junk file if the attribute information of the file is matched with the preset junk file identification rule.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
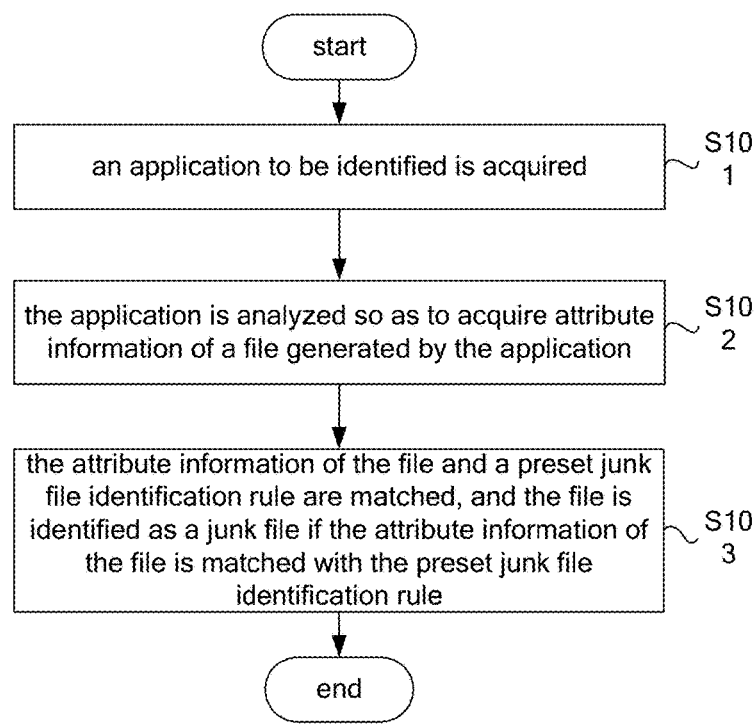
FIG. 1 is a flow chart of a method for automatically identifying a junk file according to an embodiment of the present disclosure.

Reference will now be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative and used to generally understand the present disclosure. The embodiments shall not be construed to limit the present disclosure.

In the following, a method for automatically identifying a junk file and a device for automatically identifying a junk file according to embodiments of the present disclosure will be described with reference to the drawings.

FIG. 1 is a flow chart of a method for automatically identifying a junk file according to an embodiment of the present disclosure.

As shown in FIG. 1, the method for automatically identifying a junk file may include the followings.

In S101, an application to be identified is acquired.

In embodiments of the present disclosure, the application may be acquired by web crawlers. For example, various social applications, game applications, system applications and the like using the Android system.

In S102, the application is analyzed so as to acquire attribute information of a file generated by the application.

In embodiments of the present disclosure, firstly, a static analysis is performed on the application to acquire information of the application.

Specifically, an installation package file of the application such as an APK file is analyzed to acquire basic information, permission information, control information, input/output function information and the like of the application.

Then, it is determined whether the application has a function to access to an external storage. If the application has the function to access to the external storage, a dynamic analysis may be performed on the application according to the above acquired information, so as to acquire the attribute information of the file generated by the application.

Specifically, a device with a corresponding simulation environment may be selected according to a type of the application, and then the application is installed on the selected device. The application is triggered to run according to the information of the application, and the file is generated. More specifically, the application may be triggered to run by sending an event according to the information of the application, or by automatically simulating a click according to the information of the application.

In S103, the attribute information of the file and a preset junk file identification rule are matched, and the file is identified as a junk file if the attribute information of the file is matched with the preset junk file identification rule.

Specifically, the attribute information of the file may include path information of the file, which may include a catalog and a file name.

In embodiments of the present disclosure, it may be determined whether the path information of the file includes a preset key word, or whether the file name of the file generated by the application includes a suffix if the type of the application is a preset type, so as to identify the file generated by the application. For example, a "log" file (file in a log record form) generated when the application is installed, a file with a suffix "*.tmp" (temporary file) generated when the application runs and the like may be junk files.

In embodiments of the present disclosure, after the above file is identified as the junk file, a characteristic of the file may be extracted and sent to a server, so as to update a junk file characteristic library.

With the method for automatically identifying a junk file in embodiments of the present disclosure, by analyzing the application, acquiring the attribute information of the file generated by the application, and matching the attribute information of the file and the preset junk file identification rule to identify whether the file generated by the application is the junk file, the junk file may be identified more quickly, simply, and intelligently, such that the cost is reduced and the identification efficiency is improved.

Figure 2:
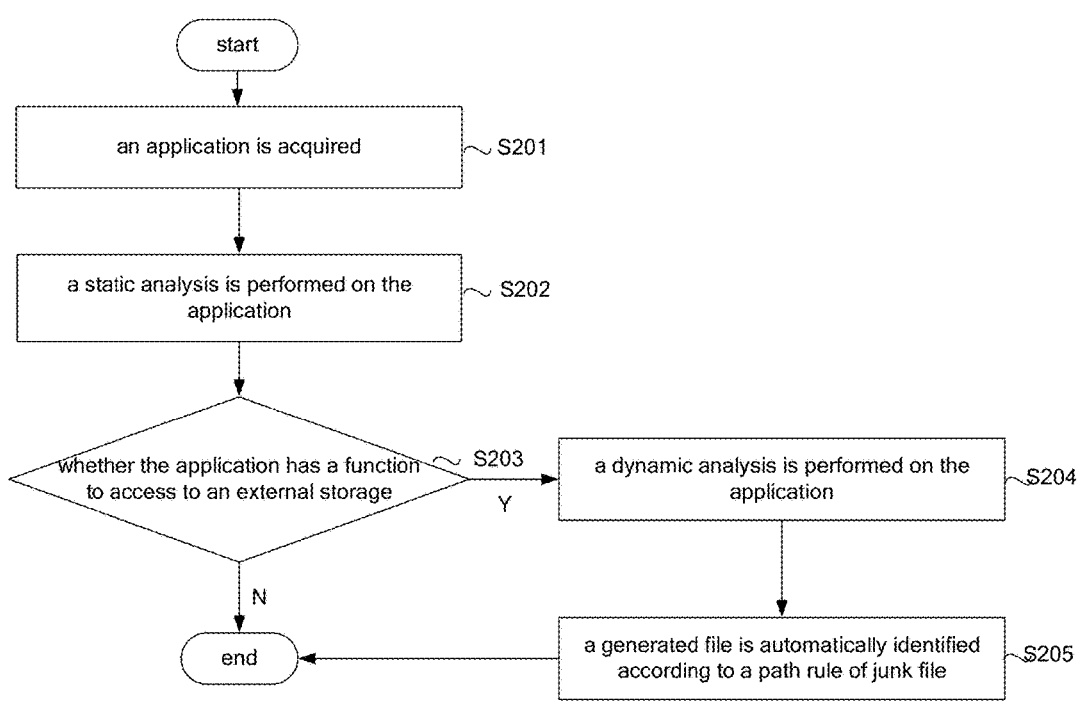
FIG. 2 is a flow chart of a method for automatically identifying a junk file according to a specific embodiment of the present disclosure.

FIG. 2 is a flow chart of a method for automatically identifying a junk file according to a specific embodiment of the present disclosure.

As shown in FIG. 2, a method for updating a file characteristic library may include followings.

In S201, an application is acquired.

Specifically, the latest application using the Android system may be acquired by web crawlers.

In S202, a static analysis is performed on the application.

Figure 3:
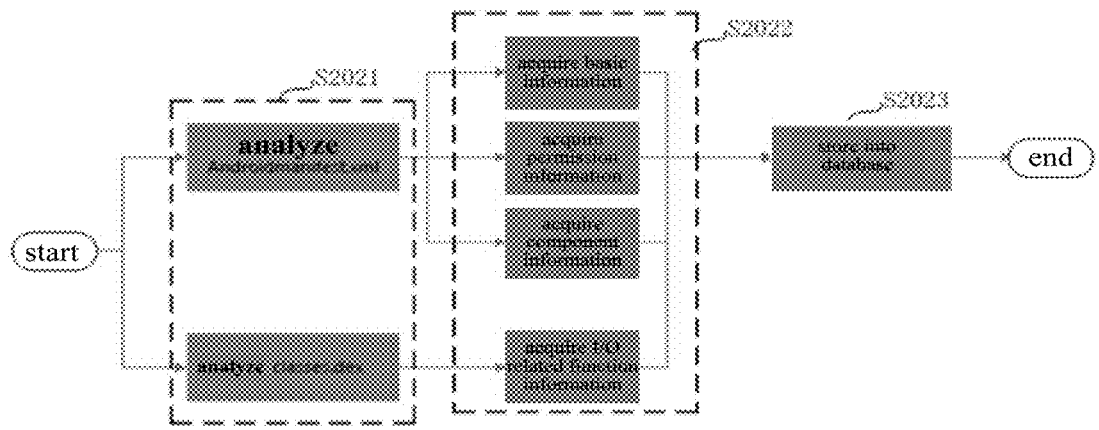
FIG. 3 is a flow chart of a static analysis according to a specific embodiment of the present disclosure.

Specifically, a process flow of analyzing the application statically will be shown in FIG. 3.

In S2021, an "Androidmanifest.xml" file and a "classes.dex" file are analyzed.

In S2022, basic information, permission information, component information and the like of the application may be acquired according to a result of analyzing the "Androidmanifest.xml" file; I/O (input/output interface) related function information may be acquired according to a result of analyzing the "classes.dex" file.

In S2023, the above information is stored into a database.

In S203, it is determined whether the application has a function to access to an external storage. If yes, S204 is executed, otherwise, the process is finished.

In S204, a dynamic analysis is performed on the application.

Figure 4:
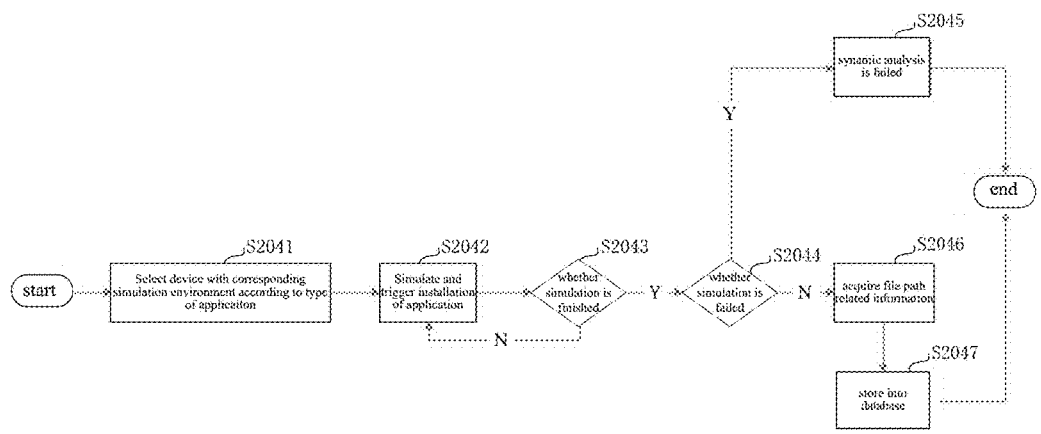
FIG. 4 is a flow chart of a dynamic simulation according to a specific embodiment of the present disclosure.

Specifically, a process flow of analyzing the application dynamically will be shown in FIG. 4.

In S2041, a device with a corresponding simulation environment is selected according to a type of the application.

In S2042, an installation of the application is simulated and triggered.

In S2043, it is determined whether the simulation is finished; if yes, S2044 is executed otherwise S2042 is executed.

In S2044, it is determined whether the simulation is failed; if yes S2045 is executed otherwise S2046 is executed.

In S2045, the dynamic analysis is failed.

In S2046, file path related information is acquired.

In S2047, the file path related information is stored into the database.

In S205, a generated file is automatically identified according to a path rule of junk file.

Specifically, the path rule of junk file may be acquired. The path rule of junk file may include a white rule and a black rule. The generated file and the while rule may be matched, and if the generated file is matched with the white rule, then the generated file is not a junk file. The generated file and the black rule may be matched, and if the generated file is matched with the black rule, then the generated file is a junk file.

Further, an artificial verification may be performed. If there is no problem, then the file path is used as a characteristic to perform an internal test and then is published to a test user. After testing a period of time, if there is an error report feedback, then the error characteristic is deleted and then the junk file path rule is updated; if there is no error report feedback, the characteristic may be published to the user. For example, after the social applications are filtered through the white rule and black rule, a video file without a suffix or an audio file without a suffix may be configured as a junk file.

With the method for automatically identifying a junk file in embodiments of the present disclosure, by performing the static analysis on the application and then simulating the installation of application to acquire the path related information of the generated file, and matching the path related information and the path rule of junk file, the junk file may be automatically identified and the characteristic may be published to update the characteristic library, such that the artificial cost is reduced, and the identification efficiency is improved, and the junk file may be identified and cleared more quickly and accurately, thus ensuring the running speed of user devices.

In order to implement the above embodiments, the present disclosure further provides a device for automatically identifying a junk file.

Figure 5:
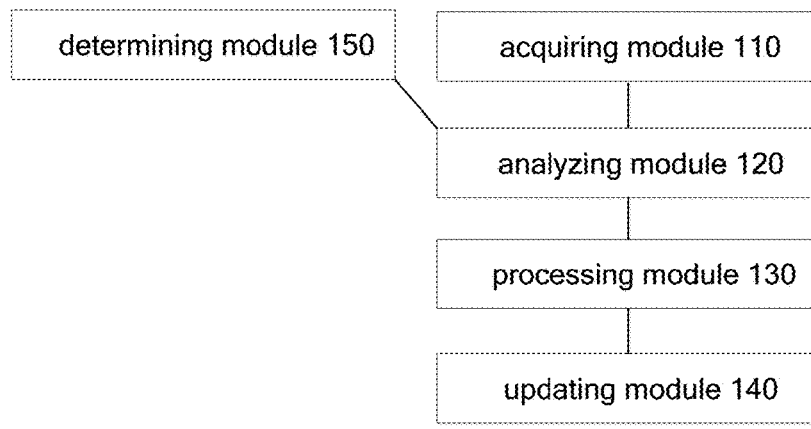
FIG. 5 is a block diagram of a device for automatically identifying a junk file according to an embodiment of the present disclosure.

FIG. 5 is a block diagram of a device for automatically identifying a junk file according to an embodiment of the present disclosure.

As shown in FIG. 5, the device for automatically identifying a junk file includes an acquiring module 110, an analyzing module 120 and a processing module 130.

The acquiring module 110 is configured to acquire an application to be identified.

In embodiments of the present disclosure, the acquiring module 110 may acquire the application by web crawlers. For example, various social applications, game applications, system applications and like using the Android system.

The analyzing module 120 is configured to analyze the application to acquire attribute information of a file generated by the application.

In embodiments of the present disclosure, the analyzing module 120 may perform a static analysis on the application to acquire information of the application.

Specifically, the analyzing module 120 may analyze an installation package file of the application such as an APK file to acquire basic information, permission information, control information, input/output function information and the like of the application. And then the analyzing module 120 may perform a dynamic analysis on the application according to the above acquired information, so as to acquire the attribute information of the file generated by the application.

Specifically, the analyzing module 120 may select a device with a simulation environment corresponding to a type of the application, and then install the application on the selected device. The application is triggered to run according to the information of the application, and the file is generated. More specifically, the analyzing module 120 may trigger the application to run by sending an event according to the information of the application, or by automatically simulating a click according to the information of the application.

The processing module 130 is configured to match the attribute information of the file and a preset junk file identification rule, and to identify the file a junk file if the attribute information of the file is matched with the preset junk file identification rule.

Specifically, the attribute information of the file may include path information of the file, which may include a catalog and a file name.

In embodiments of the present disclosure, the processing module 130 may determine whether the path information of the file includes a preset key word, or whether the file name of the file generated by the application includes a suffix if the type of the application is a preset type, so as to identify the file generated by the application. For example, a "log" file (file in a log record form) generated when the application is installed, a file with a suffix "*.tmp" (temporary file) generated when the application runs and the like may be junk files.

In addition, the device for automatically identifying a junk file may further include an updating module 140.

Specifically, if the file is identified as a junk file, the updating module 140 may extract a characteristic of the junk file and send the characteristic to a sever so as to update a junk file characteristic library.

Further, the device for automatically identifying a junk file may further include a determining module 150.

The determining module 150 is configured to determine whether the application has a function to access to an external storage before the analyzing module 120 performs a dynamic analysis on the application according to the acquired information.

With the device for automatically identifying a junk file in embodiments of the present disclosure, by analyzing the application, acquiring the attribute information of the file generated by the application, and matching the attribute information of the file and the preset junk file identification rule to identify whether the file generated by the application is the junk file, the junk file may be identified more quickly, simply, and intelligently, such that the cost is reduced and the identification efficiency is improved.

In order to implement the above embodiments, the present disclosure further provides a storage medium, configured to store an application program that, when run, executes the method for automatically identifying a junk file according to any one of embodiments of the present disclosure.

In order to implement the above embodiments, the present disclosure further provides a mobile terminal. The mobile terminal includes: a shell, a processor, a memory, a circuit board and a power supply circuit, in which the circuit board is located in a space formed by the shell, the processor and the memory are arranged on the circuit board; the power supply circuit is configured to supply power for each circuit or component in the mobile terminal; the memory is configured to store executable program codes; the processor executes a program corresponding to the executable program codes by reading the executable program codes stored in the memory so as to perform followings.

S101', an application to be identified is acquired.

In embodiments of the present disclosure, the application may be acquired by web crawlers. For example, various social applications, game applications, system applications and the like using the Android system.

S102', the application is analyzed so as to acquire attribute information of a file generated by the application.

In embodiments of the present disclosure, firstly, a static analysis is performed on the application to acquire information of the application.

Specifically, an installation package file of the application such as an APK file is analyzed to acquire basic information, permission information, control information, input/output function information or the like of the application.

Then, it is determined whether the application has a function to access to an external storage. If the application has the function to access to the external storage, a dynamic analysis may be performed on the application according to the above acquired information, so as to acquire the attribute information of the file generated by the application.

Specifically, a device with a corresponding simulation environment may be selected according to a type of the application, and then the application is installed on the selected device. The application is triggered to run according to the information of the application, and the file is generated. More specifically, the application may be triggered to run by sending an event according to the information of the application, or by automatically simulating a click according to the information of the application.

S103', the attribute information of the file and a preset junk file identification rule are matched, and the file is identified as a junk file if the attribute information of the file is matched with the preset junk file identification rule.

Specifically, the attribute information of the file may include path information of the file, which may include a catalog and a file name.

In embodiments of the present disclosure, it may be determined whether the path information of the file includes a preset key word, or whether the file name of the file generated by the application includes a suffix if the type of the application is a preset type, so as to identify the file generated by the application. For example, a "log" file (file in a log record form) generated when the application is installed, a file with a suffix "*.tmp" (temporary file) generated when the application runs and the like may be junk files.

In embodiments of the present disclosure, after the above file is identified as the junk file, a characteristic of the file may be extracted and sent to a server, so as to update a junk file characteristic library.

With the mobile terminal in embodiments of the present, by analyzing the application, acquiring the attribute information of the file generated by the application, and matching the attribute information of the file and the preset junk file identification rule to identify whether the file generated by the application is the junk file, the junk file may be identified more quickly, simply, and intelligently, such that the cost is reduced and the identification efficiency is improved.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, under the situation of not conflicting mutually, those skilled in the related art may combine different embodiments or examples with features of different embodiments or examples described through this specification.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the acts of the progress. Although the flow chart shows a specific order of execution, it is understood that the order of execution may differ from that which is depicted. For example, the order of execution of two or more boxes may be scrambled relative to the order shown.

The logic and/or act described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of acts or methods may be realized by the software or firmware stored in the memory and executed by the appropriate instruction execution system. For example, if it is realized by the hardware, likewise in another embodiment, the acts or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the acts in the above exemplifying method of the present disclosure may be achieved by commanding the related hardware with programs. The programs may be stored in a computer readable storage medium, and the programs comprise one or a combination of the acts in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented method for automatically identifying a junk file comprising:

acquiring, at one or more computing devices, an application to be identified;

analyzing, at the one or more computing devices, the application so as to acquire attribute information of a file generated by the application;

matching, at the one or more computing devices, the attribute information of the file an a preset junk file identification rule; and identifying, at the one or more computing devices, the file as a junk file if the attribute information of the file is matched with the preset junk file identification rule, wherein analyzing, at the one or more computing devices, the application so as to acquire attribute information of a file generated by the application comprises:

performing, at the one or more computing devices, a static analysis on the application so as to acquire information of the application;

wherein performing the static analysis comprises:

analyzing a first installation package file of the application to acquire basic information, permission information, and component information of the application;

analyzing a second installation package file of the application to acquire input/output (I/O) related function information of the application;

storing the acquired basic information, permission information, component information, and I/O related function information into a database; and determining whether the application has a function to access to a storage that is external to the one or more computing devices;

if the application has a function to access to an external storage:

performing, at the one or more computing devices, a dynamic analysis on the application according to the information of the application, so as to acquire the attribute information of the file generated by the application; and identifying, according to a path rule, whether or not the file generated is a junk file.

2. The method according to claim 1, after identifying the filed as a junk file, further comprising:

extracting, at the one or more computing devices, a characteristic of the junk file, and sending the characteristic to a server so as to update a junk file characteristic library.

3. The method according to claim 1, wherein the attribute information of the file comprises: path information of the file, wherein the path information of the file comprises a catalog and a file name.

4. The method according to claim 3, wherein matching, at the one or more computing devices, the attribute information of the file with a preset junk file identification rule comprises:

determining, at the one or more computing devices, whether the path information of the file comprises a preset key word; or determining, at the one or more computing devices, whether the file name of the file generated by the application comprises a suffix, if a type of the application is a preset type.

5. The method according to claim 1, wherein performing, at the one or more computing devices, the dynamic analysis on the application according to the information of the application so as to acquire the attribute information of the file generated by the application comprises:

selecting, at the one or more computing devices, a device with a corresponding simulation environment according to a type of the application; and installing, at the one or more computing devices, the application on the device, triggering the application to run according to the information of the application, and generating the file.

6. The method according to claim 5, wherein triggering, at the one or more computing devices, the application to run according to the information of the application comprises:

triggering, at the one or more computing devices, the application to run by sending an even according to the information of the application; or triggering, at the one or more computing devices, the application to run by automatically simulating a click according to the information of the application.

7. A mobile terminal, comprising:

a shell;

a processor;

a memory;

a circuit board; and a power supply circuit, wherein the circuit board is located in a space formed by the shell, the processor and the memory are arranged on the circuit board; the power supply circuit is configured to supply power for each circuit or component in the mobile terminal; the memory is configured to store executable program codes; the processor is configured to execute a program corresponding to the executable program codes by reading the executable program codes stored in the memory so as to perform:

acquiring an application to be identified;

analyzing the application so as to acquire attribute information of a file generated by the application;

matching the attribute information of the file with a preset junk file identification rule; and identifying the file as a junk file if the attribute information of the file is matched with the preset junk file identification rule, wherein analyzing the application so as to acquire attribute information of a file generated by the application comprises:

performing a static analysis on the application so as to acquire information of the application, wherein performing the static analysis comprises:

analyzing a first installation package file of the application to acquire basic information, permission information, and component information of the application;

analyzing a second installation package file of the application to acquire basic information, permission information, and component information of the application;

analyzing a second installation package file of the application to acquire input/output (I/O) related function information of the application;

storing the acquired basic information, permission information, component information, and I/O related function information into a database; and determining whether the application has a function to access to a storage that is external to the mobile terminal, if the application has a function to access to an external storage:

performing, at the one or more computing devices, a dynamic analysis on the application according to the information of the application, so as to acquire the attribute information of the file generated by the application; and identifying, according to a path rule, whether or not the file generated is a junk file.

8. The mobile terminal according to claim 7, wherein the processor is configured to execute a program corresponding to the executable program codes by reading the executable program codes stored in the memory so as to further perform:

extracting a characteristic of the junk file, and sending the characteristic to a server so as to update a junk file characteristic library after identifying the file as a junk file.

9. The mobile terminal according to claim 7, wherein the attribute information of the file comprises: path information of the file, wherein the path information of the file comprises a catalog and a file name.

10. The mobile terminal according to claim 9, wherein the processor is configured to perform matching the attribute information of the file with a preset junk file identification rule by an act of:

determining whether the path information of the file comprises a preset key word; or determining whether the file name of the file generated by the application comprises a suffix, if a type of the application is a preset type.

11. The mobile terminal according according to claim 7, wherein the processor is configured to perform performing a dynamic analysis on the application according to the information of the application so as to acquire the attribute information of the file generated by the application by acts of:

selecting a device with a corresponding simulation environment according to a type of the application; and installing the application on the device, triggering the application to run according to the information of the application, and generating the file.

12. The mobile terminal according to claim 11, wherein the processor is configured to perform triggering the application to run according to the information of the application by an act of:

triggering the application to run by sending an event according to the information of the application; or triggering the application to run by automatically simulating a click according to the information of the application.

13. A non-transitory computer storage medium having one or more modules stored therein, wherein the one or more modules are caused to perform:

acquiring an application to be identified;

analyzing the application so as to acquire attribute information of a file generated by the application matching the attribute information of the file with a preset junk file identification rule; and identifying the file as a junk file if the attribute information of the file is matched with the preset junk file identification rule, wherein analyzing the application so as to acquire attribute information of a file generated by the application comprises:

performing a static analysis on the application so as to acquire information of the application, wherein performing the static analysis comprises:

analyzing a first installation package file of the application to acquire basic information of the application;

analyzing a second installation package file of the application to acquire input/output (I/O) related function information of the application;

storing the acquired basic information, permission information, component information, and I/O related Function information into a database; and determining whether the application has a function to access to a storage that is external to the non-transitory computer storage medium, if the application has a function to access to an external storage:

performing at the one or more computing devices, a dynamic analysis on the application according to the information of the application, so as to acquire the attribute information of the file generated by the applications; and identifying, according to a path rule, whether or not the file generated is a junk file.

* * * * *

UNITED STATES PATENT AND TRADEMARK OFFICE
CERTIFICATE OF CORRECTION

PATENT NO. : 10,318,479 B2
APPLICATION NO. : 15/318215
DATED : June 11, 2019
INVENTOR(S) : Guoqing Yuan et al.

Page 1 of 1

It is certified that error appears in the above-identified patent and that said Letters Patent is hereby corrected as shown below:

In the Claims

At Column 9, Claim number 1, Line number 2, the word "an" should read -- and --.

At Column 9, Claim number 2, Line number 39, the word "filed" should read -- file --.

At Column 10, Claim number 7, Line numbers 47-50, the paragraph "analyzing a second installation package file of the application to acquire basic information, permission information, and component information of the application;" should be deleted.

At Column 12, Claim number 13, Line number 9, the punctuation ";" is missing and should be added after the word "application".

At Column 12, Claim number 13, Line numbers 20-22, the paragraph "analyzing a first installation package file of the application to acquire basic information of the application;" should read
-- analyzing a first installation package file of the application to acquire basic information, permission information, and component information of the application; --.

At Column 12, Claim number 13, Line number 28, the word "Function" should read -- function --.

At Column 12, Claim number 13, Line number 35, a "," should be added after the word "performing".

At Column 12, Claim number 13, Line number 39, the word "applications" should read
-- application --.

Signed and Sealed this
Tenth Day of December, 2019

Andrei Iancu
*Director of the United States Patent and Trademark Office*